United States Patent
Stewart et al.

(10) Patent No.: US 8,872,633 B2
(45) Date of Patent: Oct. 28, 2014

(54) RAMPED INTERROGATION POWER LEVELS

(75) Inventors: Roger Green Stewart, Morgan Hill, CA (US); William R. Bemiss, San Leandro, CA (US)

(73) Assignee: Intelleflex Corporation, San Jose, CA (US)

(*) Notice: Subject to any disclaimer, the term of this patent is extended or adjusted under 35 U.S.C. 154(b) by 1066 days.

(21) Appl. No.: 11/186,494

(22) Filed: Jul. 20, 2005

(65) Prior Publication Data

US 2007/0018793 A1    Jan. 25, 2007

(51) Int. Cl.
| G05B 19/00 | (2006.01) |
| H04Q 5/22 | (2006.01) |
| G06K 7/10 | (2006.01) |
| G06K 7/00 | (2006.01) |

(52) U.S. Cl.
CPC ........ G06K 7/10029 (2013.01); G06K 7/10356 (2013.01); G06K 7/0008 (2013.01)
USPC .......................... 340/10.3; 340/10.2; 340/5.61

(58) Field of Classification Search
CPC .......... G06K 7/10059; G06K 19/0723; G06K 7/10039; G06K 2017/0045; G06K 7/10029; G06K 7/0008; G06K 7/10356; G07C 9/00309; G07C 2009/00793; G07C 2209/63; G07C 9/00111; B60R 25/24; G08B 13/2462; H04Q 5/22; G05B 19/00
USPC ............... 340/10.3, 10.2, 5.61; 455/522, 442, 455/13.4, 574, 67.11
See application file for complete search history.

(56) References Cited

U.S. PATENT DOCUMENTS

| 5,854,593 | A | * | 12/1998 | Dykema et al. | ......... | 340/825.22 |
| 5,963,144 | A | | 10/1999 | Kruest | ...................... | 340/825.54 |
| 6,212,360 | B1 | * | 4/2001 | Fleming et al. | ............... | 455/13.4 |
| 6,320,509 | B1 | | 11/2001 | Brady et al. | ................ | 340/572.7 |
| 6,441,719 | B1 | | 8/2002 | Tsui | | |
| 6,486,769 | B1 | | 11/2002 | McLean | ..................... | 340/10.32 |
| 6,531,957 | B1 | | 3/2003 | Nysen | .......................... | 340/10.1 |
| 6,535,109 | B1 | | 3/2003 | Mahdavi | ..................... | 340/10.3 |
| 6,628,957 | B1 | * | 9/2003 | Weaver et al. | ................ | 455/522 |
| 6,661,336 | B1 | | 12/2003 | Atkins et al. | ................. | 340/10.2 |
| 6,707,376 | B1 | | 3/2004 | Patterson et al. | ............ | 340/10.3 |

(Continued)

FOREIGN PATENT DOCUMENTS

| EP | 0689161 A2 | 12/1995 | ............. G06K 17/00 |
| EP | 0944015 | 9/1999 | |

(Continued)

OTHER PUBLICATIONS

PCT Written Opinion and Search Report from related PCT Application No. PCT/US2006/026022 mailed on Mar. 15, 2007.

(Continued)

Primary Examiner — Omer S Khan
(74) Attorney, Agent, or Firm — Zilka-Kotab, PC

(57) ABSTRACT

A method for communicating with a plurality of radio frequency (RF) devices includes transmitting a first signal at a first power level, interrogating RF devices responding to the first signal, instructing the responding RF devices to change state, and transmitting a second signal at a second power level higher than the first power level. The RF devices responding to the first signal do not respond to the second signal upon changing state.

8 Claims, 7 Drawing Sheets

(56) References Cited

U.S. PATENT DOCUMENTS

| | | | |
|---|---|---|---|
| 6,765,484 B2 | 7/2004 | Eagleson et al. | 340/505 |
| 6,806,812 B1 | 10/2004 | Cathey | 340/572.7 |
| 7,019,664 B2 * | 3/2006 | Turner et al. | 340/825.52 |
| 2002/0149484 A1 | 10/2002 | Carrender | 340/572.4 |
| 2003/0104848 A1 | 6/2003 | Brideglall | 455/574 |
| 2004/0036575 A1 | 2/2004 | Patterson et al. | 340/10.3 |
| 2004/0160309 A1 | 8/2004 | Stilp | 340/10.2 |
| 2004/0160322 A1 | 8/2004 | Stilp | 340/572.1 |
| 2004/0198233 A1 | 10/2004 | Pratt et al. | 455/67.11 |
| 2004/0201457 A1 | 10/2004 | O'Toole et al. | 340/10.33 |
| 2005/0088284 A1 | 4/2005 | Zai et al. | |
| 2006/0038658 A1 * | 2/2006 | Jarvis et al. | 340/10.1 |

FOREIGN PATENT DOCUMENTS

| | | | |
|---|---|---|---|
| EP | 0944015 A2 | 9/1999 | |
| EP | 0944015 A2 | 9/1999 | G06K 7/00 |
| EP | 1172755 A1 | 1/2002 | G06K 7/00 |

OTHER PUBLICATIONS

PCT International Preliminary Report from PCT Application No. PCT/US2006/026022 mailed on Dec. 19, 2007.

European Office Action Summary from application No. 06786240.9-2210 mailed on Jan. 5, 2009.

European Examination Report from application No. 06786240.9 dated Jul. 5, 2011.

Office Action from Chinese Application No. 200680024679.1 dated Jan. 12, 2012.

International Preliminary Report on Patentability from PCT Application No. PCT/US06/26022 dated Apr. 18, 2011.

Taiwan Office Action from application No. 95124214 sent to us on Aug. 8, 2012.

European Office Communication from application No. 06786240.9 dated Aug. 23, 2012.

Indian First Examination Report from application No. 2127/MUMNP/2007 dated Oct. 15, 2012.

Chinese Office Action from Chinese Application No. 200680024679.1 dated Oct. 16, 2009 (no translation).

Intent to Grant from European Application No. 06786240.9 dated Sep. 17, 2013.

Chinese Office Action from Application No. 200680024679.1 dated Sep. 16, 2013.

Notice of Preliminary Rejection from Taiwan application No. 095124214 dated May 15, 2013.

Notification of Reexamination from Chinese Application No. 200680024679.1 dated Apr. 18, 2014.

Decision on Reexamination from Chinese Application No. 200680024679.1 dated Jul. 31, 2014.

* cited by examiner

RAMPED INTERROGATION POWER LEVELS

FIELD OF THE INVENTION

The present invention relates to wireless communications systems, and more particularly, this invention relates to systems and methods for ramping power levels of an interrogator for improving communications between the interrogator and a plurality of wireless devices.

BACKGROUND OF THE INVENTION

Radio Frequency Identification (RFID) technology employs a radio frequency ("RF") wireless link and ultra-small embedded computer circuitry. RFID technology allows physical objects to be identified and tracked via these wireless "tags". It functions like a bar code that communicates to the reader automatically without requiring manual line-of-sight scanning or singulation of the objects. RFID promises to radically transform the retail, pharmaceutical, military, and transportation industries.

Several advantages of RFID technology are summarized in Table 1:

TABLE 1

| |
| --- |
| Identification without visual contact |
| Able to read/write |
| Able to store information in tag |
| Information can be renewed anytime |
| Unique item identification |
| Can withstand harsh environment |
| Reusable |
| High Flexibility/Value |

As shown in FIG. 1, a basic RFID system 100 includes several tags 102, a reader 104, and an optional server 106. Each tag 102 includes an integrated circuit (IC) chip and an antenna. The IC chip includes a digital decoder needed to execute the computer commands the tag 102 receives from the tag reader 104. The IC chip also includes a power supply circuit to extract and regulate power from the RF reader; a detector to decode signals from the reader; a back-scattering modulator to send data back to the reader; anti-collision protocol circuits; and at least enough memory to store its EPC code.

Communication begins with a reader 104 sending out signals to find the tag 102. When the radio wave hits the tag 102 and the tag 102 recognizes the reader's signal, the reader 104 decodes the data programmed into the tag 102. The information can then be passed to a server 106 for processing, storage, and/or propagation to another computing device. By tagging a variety of items, information about the nature and location of goods can be known instantly and automatically.

The system uses reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, maximum range ~3 m)
Class-2
Memory tags (8 bits to 128 Mbits programmable at maximum ~3 m range)
Security & privacy protection
Class-3
Battery tags (256 bits to 64 Kb)
Self-Powered Backscatter (internal clock, sensor interface support)
~100 meter range
Class-4
Active tags
Active transmission (permits tag-speaks-first operating modes)
Up to 30,000 meter range In RFID systems where passive receivers (i.e., Class-1 tags) are able to capture enough energy from the transmitted RF to power the device, no batteries are necessary. In systems where distance prevents powering a device in this manner, an alternative power source must be used. For these "alternate" systems (also known as active or semi-passive), batteries are the most common form of power. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

A problem frequently encountered is that of "hot" tags. Because tags communicate with the reader by backscattering the carrier signal, those tags very close to a reader create a very strong backscatter that can interfere with communications between other tags and readers located far away. Two types of interference, or "jamming", are prevalent: forward link jamming and backscatter jamming. Consider a situation in which passive tag-1 is located 0.5 meters from Reader #1. The communications therebetween include the forward link from the reader to tag, and the backscatter signal from the tag to the reader. The maximum effective range of Reader #1 is 10 m. Passive tag-2 is located 10 meters from Reader #2. Readers #1 and #2 are located 200 meters apart. A "hot" tag-1 located only 0.5 meter from Reader #1 will generate backscatter 400 times greater at 0.5 m than it would at the 10 m maximum range of the reader, as calculated by (max range/actual distance)$^2$=(10/0.5)$^2$=400×. As will soon become apparent, tag-1 generates so much backscatter that it can jam communications between tag-2 and Reader #2, even though both tag-2 and Reader #2 are located 200 meters away from tag-1. In fact, for acceptable communications, Reader #2 would need to be located over 600 meters from tag-1 and/or Reader #1 based on square-law attenuation of RF energy over distance in free space, as calculated by the following equation:

$$D = a \times b \times (d2/d1) \qquad \text{Equation 1}$$

where:
D is the distance between Reader #1 and Reader #2,
a is the extra distance necessary to provide a minimum "tag-2 to tag-1 signal to noise ratio" of at least 10 db (which is a typical minimum ratio that allows tag-2 to successfully communicate with Reader #1) [value can vary depending on system and environmental situation],
b is the maximum effective range of Reader #1,
d2 is the distance between tag-2 and Reader #2, and
d1 is the distance between tag-1 and Reader #1.
Performing the calculation, 3×10×(10/0.5)=600 meters. This is unacceptable in situations where multiple readers may be present in close proximity, as in a shopping mall. In the US, there are about 50 channels available to RFID systems. In Europe, there are currently only 10 channels. Accordingly, as RFID becomes more prevalent, readers will be using the same channels and will be using the same frequency, and the "hot tag" problem will become a serious issue that must be overcome.

Using long-range Class-3 tags and readers makes this "hot tag" problem even worse. For example, a "hot" Class-3 tag-3 located 0.5 m from Reader #3 running at a full 4 Watt (W) Effective Incident Radiated Power (EIRP) power can jam a Class-3 tag-4 located 100 meters from Reader #4 at a range of 60,000 meters in free space, where D=3×100×(100/0.5)=60, 000 meters. In English units, this "hot tag" can jam every reader operating in its channel at a range of up to 40 miles away (in free space).

One proposed solution is to have the tag detect its own incident power. If the tag detects a strong signal, it will attenuate its own backscatter. However, this adds complexity and cost to each and every tag, making it cost prohibitive.

What is needed is a cost effective and efficient way to both dramatically reduce the severity of the hot tag backscatter problem and also reduce reader-to-reader interference in the forward link as well.

SUMMARY OF THE INVENTION

A method for communicating with a plurality of radio frequency (RF) devices includes transmitting a first signal at a first power level, interrogating RF devices responding to the first signal, instructing the responding RF devices to change state, and transmitting a second signal at a second power level higher than the first power level. The RF devices responding to the first signal do not respond to the second signal upon changing state.

According to another embodiment, a method for communicating with a plurality of radio frequency (RF) devices includes transmitting a signal at a first power level, continuously increasing the signal to a second power level, interrogating RF devices responding to the signal, and instructing the responding RF devices to change state such that the RF devices do not respond to the signal upon changing state.

Another method for communicating with a plurality of radio frequency (RF) devices includes transmitting a series of signals, each sequential signal being transmitted at an increased power level, and, at each power level, singulating RF devices responding to the signal and instructing the responding RF devices to change to an unresponsive state.

A system for communicating with a plurality of radio frequency (RF) devices according to an embodiment includes a first reader, a second reader spaced apart from the first reader, a plurality of first tags closer to the first reader than the second reader, and a plurality of second tags closer to the second reader than the first reader. The first reader uses a combination of varying a transmitting power level when communicating with the first tags and instructing the first tags to become nonresponsive such that backscatter signals from the first tags received by the second reader are always less than a minimum effective backscatter signal from any second tag at the second reader.

Another system for communicating with a plurality of radio frequency (RF) devices includes a first reader having a first effective communication range, a second reader spaced apart from the first reader and having a second effective communication range, a plurality of first tags closer to the first reader than the second reader, and a plurality of second tags closer to the second reader than the first reader. The first reader uses a combination of varying a transmitting power level when communicating with the first tags and instructing the first tags to become nonresponsive such that the first reader and the second reader are operable in a same communications channel at a distance from each other of about 10 times the first effective communications range. Alternatively, the first reader uses a combination of varying a transmitting power level when communicating with the first tags and instructing the first tags to become nonresponsive such that the first reader and the second reader are operable in a same communications channel at a distance from each other of about 10 times the second effective communications range.

A radio frequency (RF) system according to another embodiment includes a plurality of RF readers, a plurality of RF tags in communication with the readers, and a reader network coordinator that controls and coordinates a multiplicity of RF readers to minimize backscatter and/or forward link jamming between the tags and the readers.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The following specification describes systems and methods for sequentially increasing a power level of an interrogator such as an RFID tag reader. In an RFID system, for example, system noise caused by "hot" tag backscatter and other background clutter can be considerably reduced by sequentially stepping or ramping the reader power to various levels instead of just going immediately to full power level. The reader will attempt to establish communication with the tags throughout each power ramping interval and will first singulate any tags that it detects nearby that are responding with adequate backscatter. These nearby tags are then put to sleep before the reader increases its power output level as necessary to interrogate more distant tags.

Figure 1:
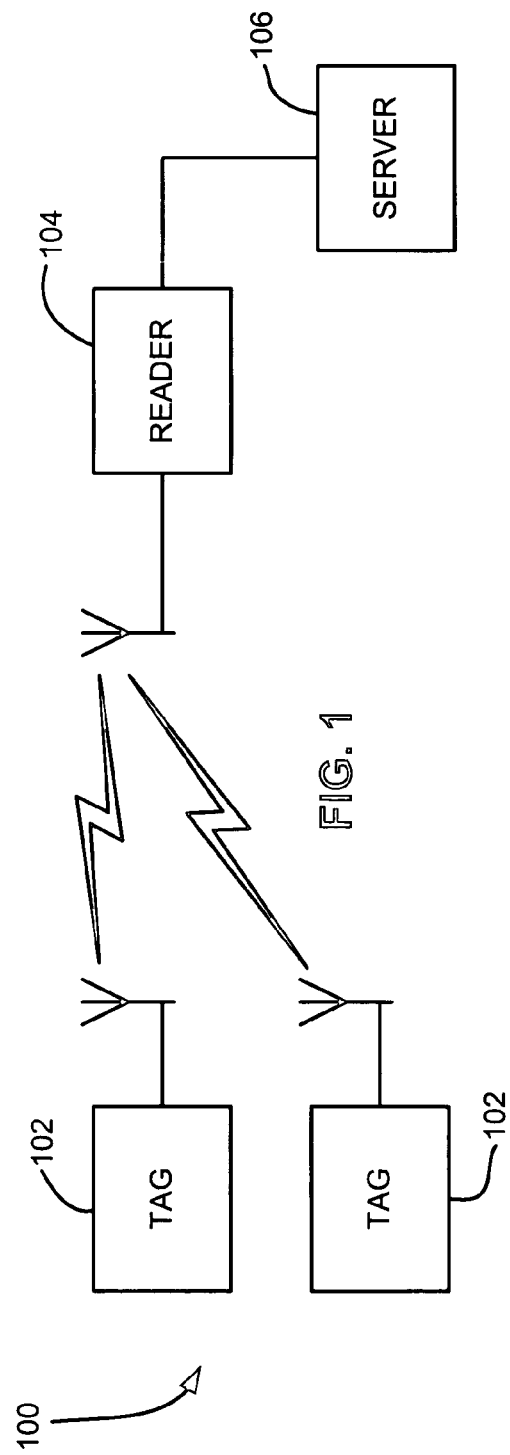
FIG. 1 is a system diagram of an RFID system.

Many types of devices can take advantage of the embodiments disclosed herein, including but not limited to Radio Frequency Identification (RFID) systems and other wireless devices/systems; portable electronic devices; audio devices, and other electronic devices; smoke detectors; etc. To provide a context, and to aid in understanding the embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. Examples of hardware include Application Specific Integrated Circuits (ASICs), printed circuits, monolithic circuits, reconfigurable hardware such as Field Programmable Gate Arrays (FPGAs), etc. Further, the methodology disclosed herein can also be incorporated into a computer program product, such as a computer disc containing software. Further, such software need not be embodied on a readable medium, but can be downloadable or otherwise transferable from one computing device to another via network, nonvolatile memory device, resident on the device, etc.

Figure 2:
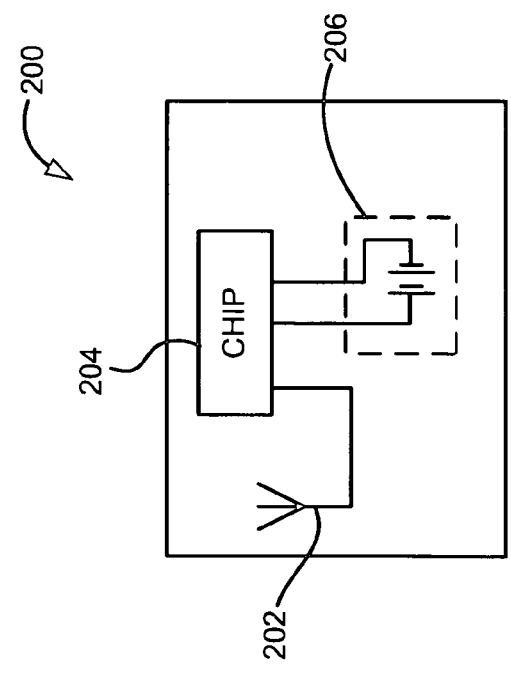
FIG. 2 is a high level circuit diagram showing a circuit for implementation in a RF device according to one embodiment.

FIG. 2 illustrates a radio frequency data communication device 200, e.g., RFID tag. The radio frequency data communication device 200 includes an integrated circuit 204, a power source 206 connected to the integrated circuit 204 to supply power to the integrated circuit 204, and at least one antenna 202 connected to the integrated circuit 204 for radio frequency transmission and reception by the integrated circuit 204. For purposes of this disclosure, including the appended claims, the term "integrated circuit" and "circuit" shall be defined as a combination of interconnected circuit elements associated on or within a continuous substrate. For purposes of this disclosure, including the appended claims, the term "semiconductive substrate" is defined to mean any construction comprising semiconductive material, including, but not limited to, bulk semiconductive materials such as a semiconductive wafer (either alone or in assemblies comprising other materials thereon), and semiconductive material layers (either alone or in assemblies comprising other materials). For purposes of this disclosure, including the appended claims, the term "substrate" refers to any supporting structure, including, but not limited to, the semiconductive substrates described above as well as printed circuit boards (PCBs). In the illustrated embodiment, the integrated circuit 204 is a monolithic integrated circuit. For purposes of this disclosure, including the appended claims, the term "monolithic integrated circuit" shall be defined as an integrated circuit wherein all circuit components are manufactured into or on top of a single chip of silicon or layer of a semiconductor. The integrated circuit 204 will be described in greater detail below. The power source 206 can be a battery and/or a power supply circuit that extracts and regulates power from the RF reader signal.

The radio frequency data communication device 200 can be included in any appropriate housing or packaging, made of plastic or any other suitable material. The device 200 is of a small size that lends itself to applications employing small housings, such as cards, miniature tags, etc. Larger housings can also be employed. The device 200, housed in any appropriate housing, can be supported from or attached to an object in any desired manner; for example using double sided tape, glue, lanyards, leash, nails, staples, rivets, or any other fastener. The housing can be sewn on to an object, hung from an object, implanted in an object (hidden), etc. A description of illustrative RFID tags and interrogators, systems, and methods of use are disclosed in U.S. Patent Appl. Pub. No. 2004/0201457A1 to O'Toole et al., which is herein incorporated by reference.

Figure 3:
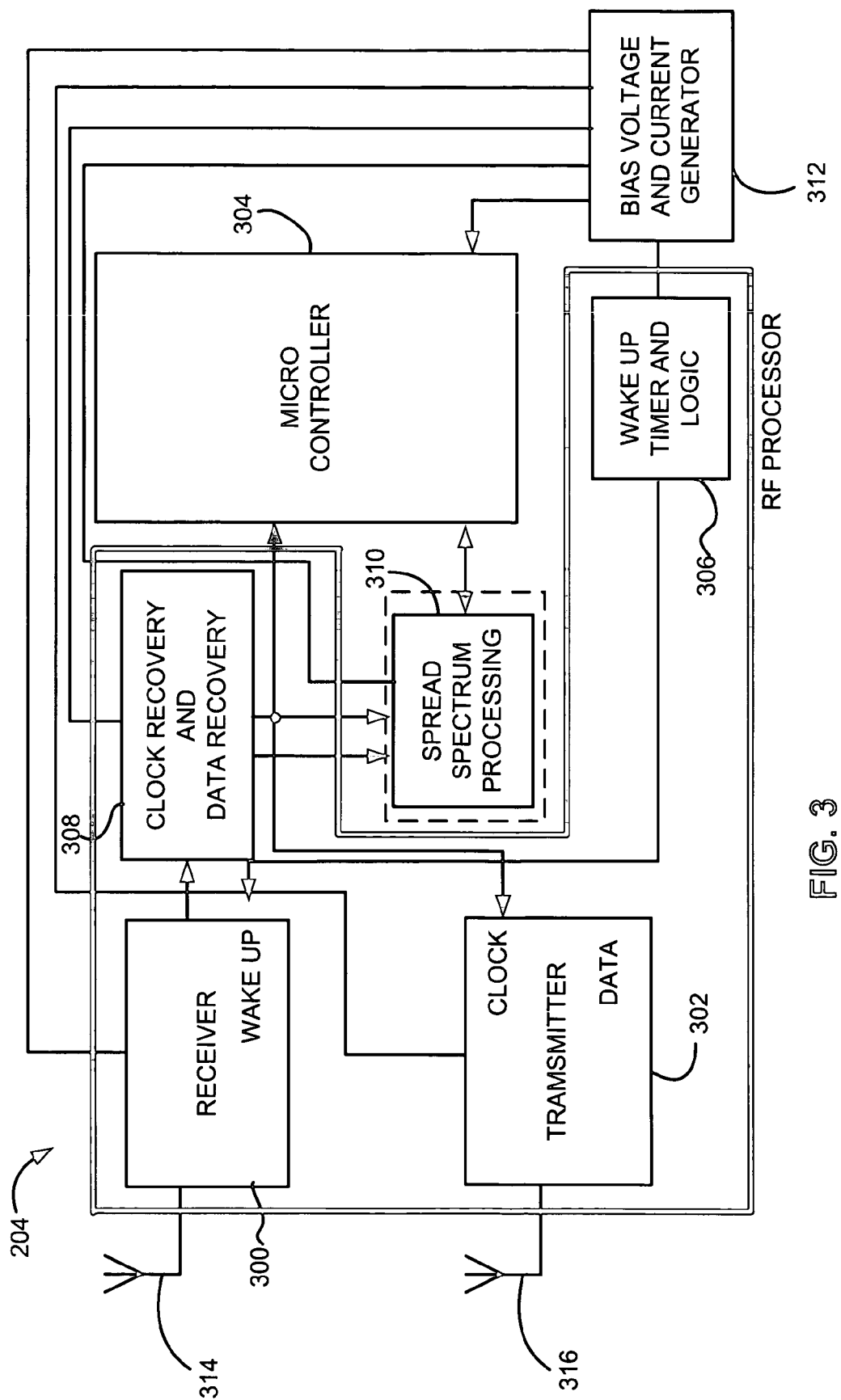
FIG. 3 is a high level circuit diagram of a monolithic semiconductor integrated circuit that may form part of the circuit of FIG. 2.

Various configurations are possible for the antenna 202. The integrated circuit 204 includes a receiver 300 and a transmitter 302 (FIG. 3). In one embodiment, separate antennas 314 and 316 are provided for receiver and transmitter of the integrated circuit 204. In another embodiment (FIG. 2), a single antenna is shared by the receiver and transmitter sections. In one embodiment, the antenna is defined by conductive epoxy screened onto a card or housing. In the illustrated embodiment, the antenna is conductively bonded to the integrated circuit via bonding pads.

In an embodiment where a single antenna is employed, that single antenna preferably comprises a folded dipole antenna defining a continuous conductive path, or loop, of microstrip. Alternatively, the antenna can be constructed as a continuous loop antenna.

If the power source 206 is a capacitance, the capacitance can take any suitable form. Preferably, the capacitance will be integrated into the monolithic integrated circuit. Instead of using a capacitance, a battery or any other suitable power source can be employed.

FIG. 3 is a high level circuit schematic of an integrated circuit 204 that can be utilized in the devices of FIG. 2. In the embodiment shown in FIG. 3, the integrated circuit 204 is a monolithic integrated circuit. More particularly, in the illustrated embodiment, the integrated circuit 204 includes the receiver 300, the transmitter 302, a micro controller or microprocessor 304, a wake up timer and logic circuit 306, a clock recovery and data recovery circuit 308, and a bias voltage and current generator 312.

In one embodiment, a spread spectrum processing circuit 310 is also included in the integrated circuit 204 and formed relative to the single die. In this embodiment, signals received by the receiver 300 are modulated spread spectrum signals. In an illustrated embodiment, the modulation scheme for replies sent by the transmitter 302 is selectable. One of the available selections for replies sent by the transmitter 302 is modulated spread spectrum.

Figure 4:
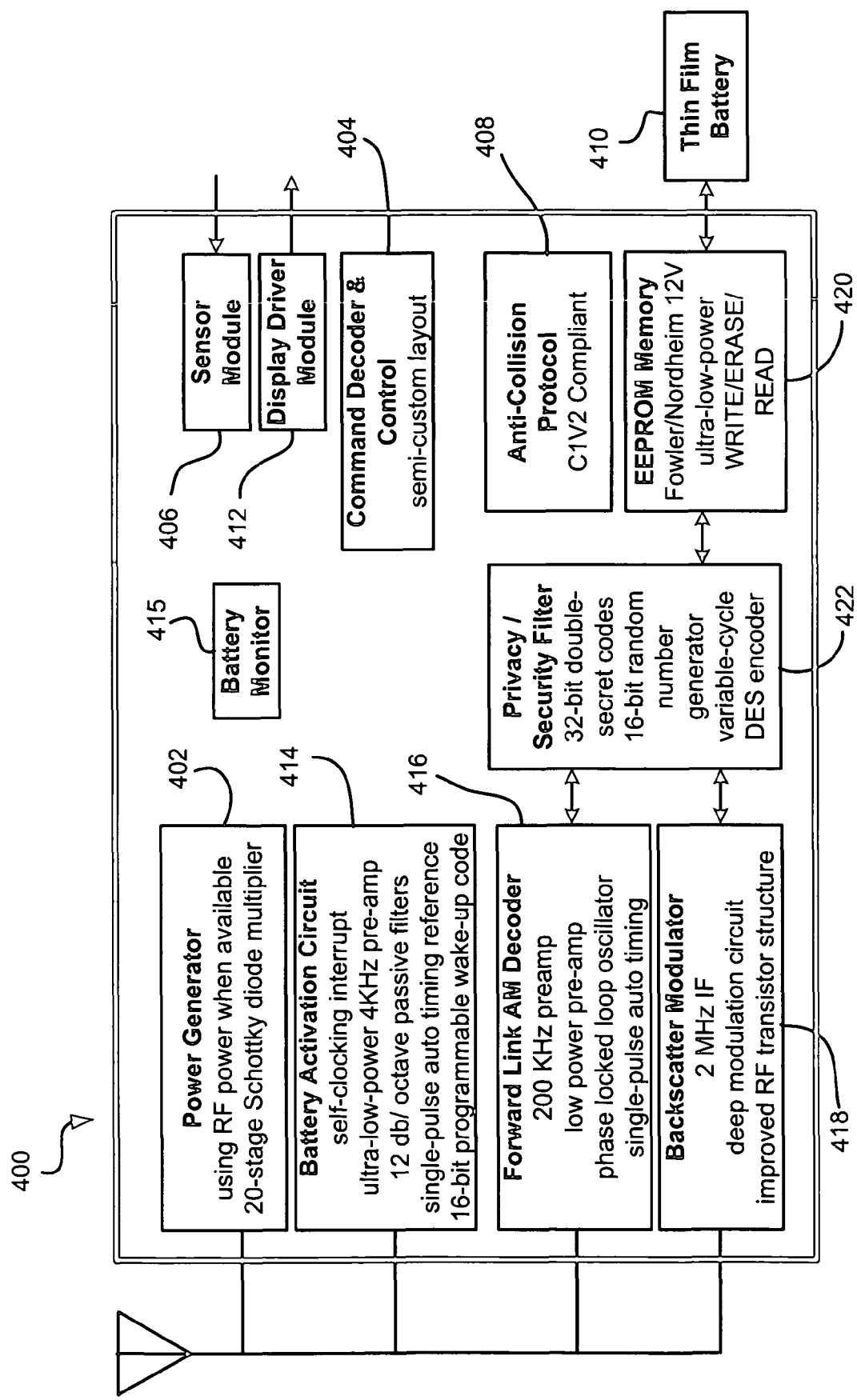
FIG. 4 is a system diagram for an integrated circuit (IC) chip for implementation in an RFID tag.

Other embodiments of the present invention are implemented in a Class-3 or higher Class chip. FIG. 4 depicts a circuit layout of a Class-3 chip 400 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 400 includes several industry-standard circuits including a power generation and regulation circuit 402, a digital command decoder and control circuit 404, a sensor interface module 406, a C1V2 interface protocol circuit 408, and a power source (battery) 410. A display driver module 412 can be added to drive a display.

A battery activation circuit 414 is also present to act as a wake-up trigger. This circuit 414 is described in detail below. In brief, the battery activation circuit 414 includes an ultra-low-power, narrow-bandwidth preamplifier with a static current drain of only 50 nA. The battery activation circuit 414 also includes a self-clocking interrupt circuit and uses an innovative 16-bit user-programmable digital wake-up code. The battery activation circuit 414 draws less power during its sleeping state and is much better protected against both accidental and malicious false wake-up trigger events that otherwise would lead to pre-mature exhaustion of the Class-3 tag battery 410.

A battery monitor 415 monitors power usage in the device. The information collected can then be used to estimate a useful remaining life of the battery.

A forward link AM decoder 416 uses a simplified phase-lock-loop oscillator that requires an absolute minimum amount of chip area. Preferably, the circuit 416 requires only a minimum string of reference pulses.

A backscatter modulator block 418 preferably increases the backscatter modulation depth to more than 50%.

A pure, Fowler-Nordheim direct-tunneling-through-oxide mechanism 420 is present to reduce both the WRITE and ERASE currents to less than 0.1 µA/cell in the EEPROM memory array. Unlike any RFID tags built to date, this will permit designing of tags to operate at maximum range even when WRITE and ERASE operations are being performed.

The module 400 may also incorporate a highly-simplified, yet very effective, security encryption circuit 422.

Only four connection pads (not shown) are required for the chip 200 to function: Vdd to the battery, ground, plus two antenna leads to support multi-element omni-directional antennas. Sensors to monitor temperature, shock, tampering, etc. can be added by appending an industry-standard I2C interface to the core chip.

Extremely low-cost Class-2 security devices can be built by simply disabling or removing the wake-up module, pre-amplifiers, and/and IF modules from the Class-3 chip core.

Several embodiments are described below with reference to specific power levels, distances, etc. to exemplify the various embodiments of the present invention. It should be kept in mind that these are provided by way of example only, and any suitable power level, number of levels, effective distance, etc. can be used, as will be apparent to one skilled in the art.

Figure 5:
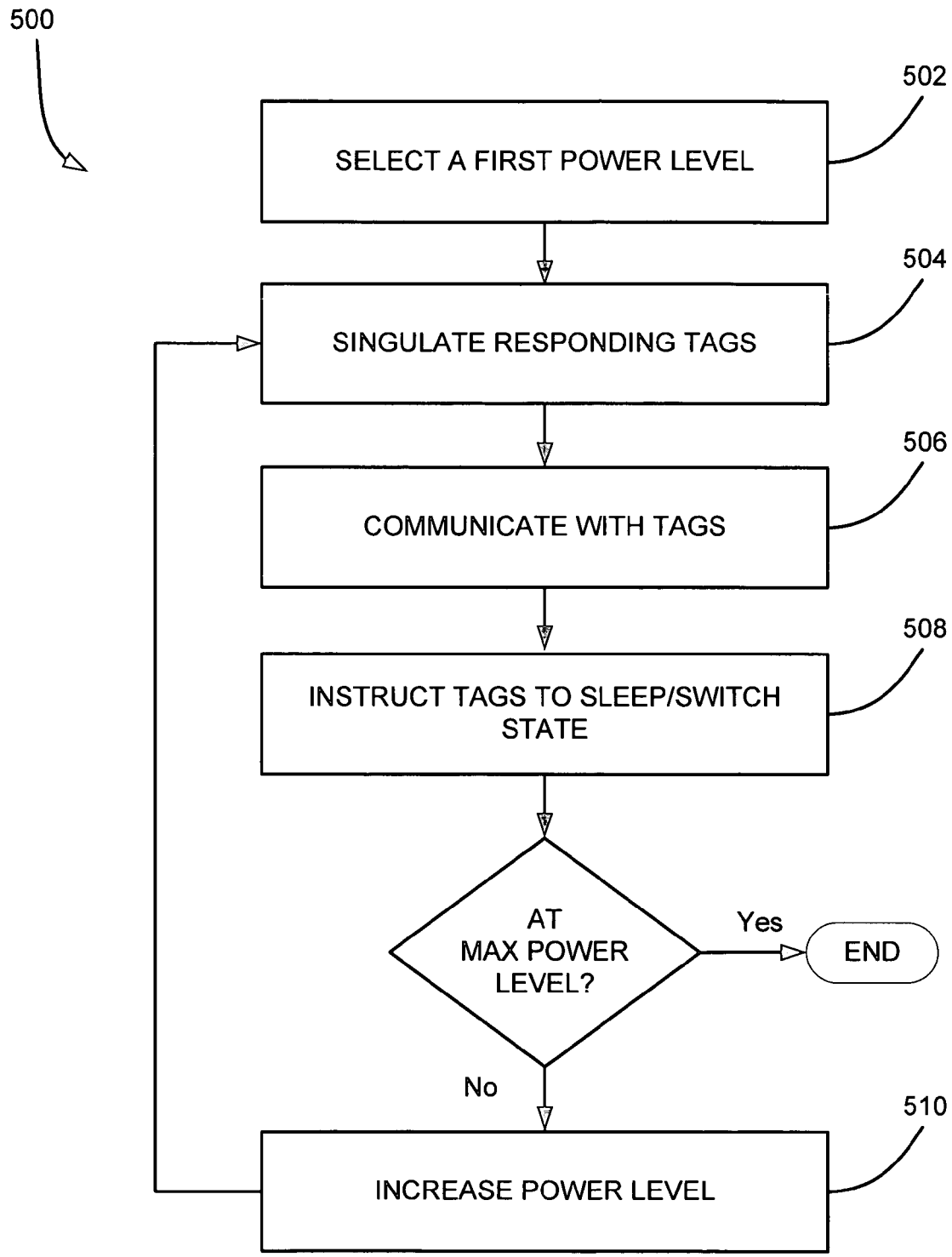
FIG. 5 is a process diagram of a method for ramping a power level.

As mentioned above, RFID tag readers can significantly reduce system noise caused by "hot" tag backscatter and other background clutter by sequentially stepping or ramping the reader power to full FCC levels instead of just going immediately to a full power level. FIG. 5 illustrates the general method 500 performed by a reader according to one embodiment. In operation 502, the reader selects a first power level. Then, in operation 504, the reader singulates some or all tags of the nearby tags that are responding with adequate backscatter. Any desired communications with the tags are conducted in optional operation 506. These nearby tags are then instructed to change state in operation 508. The change in state can be from an active mode to a sleep or hibernate mode. The change in state can also be from a responsive state to a nonresponsive state. In the latter scenario, the tag can merely not respond, the antenna can be detached from the chip, etc. When sleeping or in a nonresponsive state, the tags will not actively backscatter in response to subsequent command, and so will not jam communications of other devices.

The tags can remain in a particular state until instructed to again change state, receiving an activate command, etc. The tags can also automatically revert an active state after a period of time has elapsed, as described in copending and commonly owned US Patent Application entitled "ACCURATE PERSISTENT NODES", filed May 6, 2005 under Ser. No. 11/124,485, and which is herein incorporated by reference.

In operation 510, the reader then increases its power output level to interrogate more distant tags. Because the closest tags have already been put to sleep or otherwise commanded to be nonresponsive, the "hot tag" problem is not present. Operations 504-510 are repeated until and including when the reader reaches its full power, the maximum power allowed by law or regulation, or some other maximum desired level.

In a preferred embodiment, the readers of passive Class-1 G-2 tags operate at 3 power output levels of 100 mW EIRP, 1 W EIRP, and 4 W EIRP. The time period that the reader remains at each level can be about uniform, or can vary from power level to power level. For instance, it may be advantageous to spend more time at the 1 W level than the 100 mW level, as the effective communication area at the 1 W level is greater than at the 100 mW level. Similarly, more time can be spent at the 4 W level than at the 1 W level. The time spent at each power level can also be dependent upon the number of responding tags or the result of its protocol search. For example, the reader may step to the next power level immediately or only upon communicating with each tag effectively responding at the current power level, rather than spending a fixed time at each level.

The reader itself can select the power levels and/or how long to remain at each power level. A backend system can also instruct the reader as to which power levels to use and/or how long to remain at each power level based on a predetermined protocol or dynamic factors such as responses from one or more of the readers. The backend system can be a local or remote server for instance, and can be connected to one or more readers. Such servers are typically referred to reader network coordinators where several readers are in communication therewith.

Figure 6:
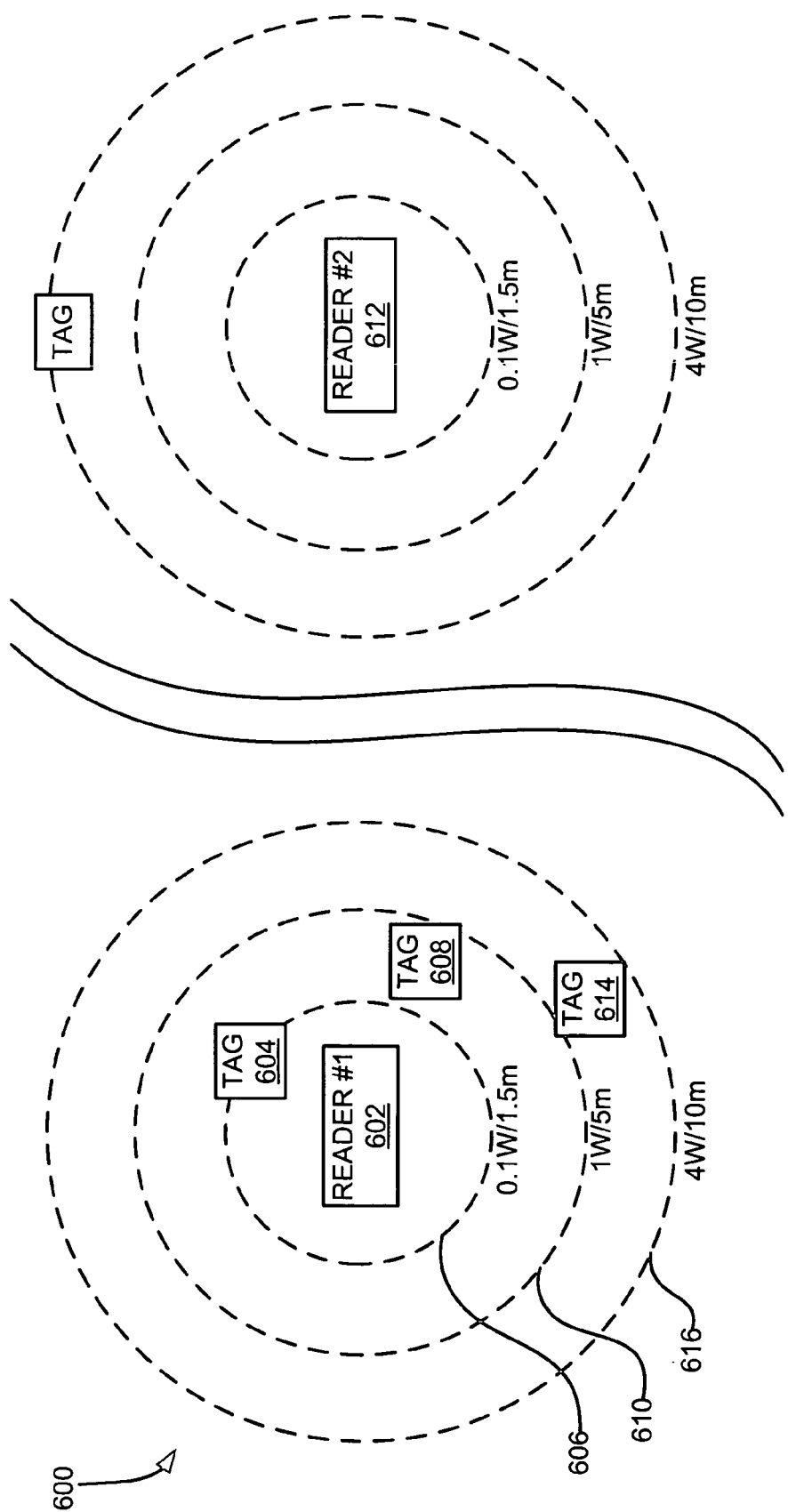
FIG. 6 is a system diagram depicting an RFID system in which an RFID reader ramps a power level to communicate with RFID tags.

FIG. 6 illustrates an illustrative RFID system 600. In this example, Reader #1 602 initiates communication with the tags 604 at the 100 mW output level. Since the typical tag requires less than 10 µW of power to operate and respond to the reader, Reader #1 602 will successfully select and singulate all of the close-in tags out to a range of about 1.5 meters, indicated by circle 606. Reader #1 602 then puts all of these tags 604 to sleep (or moves them from the A-state to the B-state) to prevent them from responding to its subsequent interrogations.

Tag-1's backscatter has thus been reduced by the Reader #1 power ratio from 4 W to 0.1 W. Accordingly, in one embodiment, the backscatter is reduced from 400× the minimum operable backscatter level to 10×, as calculated by $400\times/(4\ W_{max}/0.1\ W_{actual})=10\times$. This translates to a reduction in the jamming range to Reader #2 612 from 600 meters to only about 100 meters.

Reader #1's forward link interference to adjacent tags has also been reduced by a factor of 6 due to the lower transmission power. This is particularly beneficial where readers are in close proximity with each other. In this situation, the less time the reader is operating at full power, the better.

Next, Reader #1 602 raises it's output level to 1 W as necessary to successfully select and singulate all of the close-in tags 608 out to a range of about 5 meters, indicated by circle 610. Note however, that since all tags closer 604 than 1.5 m have already been put to sleep, another tag located 1.5 m from Reader #1 backscatters no more energy even at 1 W than a tag would at 0.1 W at 0.5 m range. The jamming range to Reader #2 612 therefore remains reduced at 100 meters or less. Reader #1 602 then puts all of these tags 608 to sleep (or moves them from the A-state to the B-state) to prevent them from responding to its subsequent interrogations.

Finally Reader #1 602 uses its full 4 W effective power level to communicate with tags 614 at its maximum 10 m range, represented by circle 616. Note however, that since all tags 604, 608 closer than 5 m have already been put to sleep, another tag located 5 m from Reader #1 backscatters no more energy even at 4 W than a tag 604 did at 0.1 at 0.5 m range. The jamming range to Reader #2 612 therefore remains at 100 meters or less (10× the maximum effective communication range of Reader #1 and Reader #2) compared to the 600 meter jamming and interference that would otherwise occur. Reader #1 602 then puts all of these tags to sleep or moves them from the A-state to the B-state as necessary to complete its inventory of the tags.

Preferably, the variation in backscattering power levels of the RF devices located within a maximum effective communication range of Reader #1 never exceeds a ratio of 100:1 maximum to minimum backscattering power level, and preferably is about 10:1 or less.

The reader can thereby control and limit the strength of the tag backscatter to minimize the jamming effect this otherwise could have on nearby tags and readers operating within the same channel. This operating method has reduced the area over which readers will jam each other by more than 97%. Jamming of the forward link between other readers and tags has also been significantly reduced, typically by about 50% assuming that Reader #1 spends approximately equal time in each of its three different output power levels.

It should also be clear to those skilled in the art, that this technique will provide an even greater benefit in long-range battery-assisted Class-3 tag systems. For example, a five-power-level Class-3 reader can operate at output power levels of, for example, 1 mW, 10 mW, 100 mW, 1 W, and 4 W. This in turn reduces the "hot-tag" backscatter jamming effect of tag-3 on tag-4 from a 60,000 m range to less than a 1000 m range in a system where Class-3 tag-3 is located 0.5 m from Reader #3 and a Class-3 tag-4 is located 100 meters from Reader #4.

Further, by being able to select the reader power level, the optimal power level for talking to the tag can be chosen. Thus, problems such as overdriving and underdriving the tags can be avoided.

An additional benefit is that the system can be programmed to communicate with any tag, regardless of protocol or manufacturer. Because power level selection can be performed on the reader in software, the tags do not have to be specifically designed to operate with the reader. Rather, the reader can find a power level best suited to communications with a particular tag by simply varying the power level until it finds a suitable communications level.

It is also clear to those skilled in the art that the reader could also ramp its output power in a continuous analog manner instead of the series of discrete steps described herein. In this case, the reader preferably singulates tags as it encounters responses with adequate backscatter from them. The speed with which the reader ramps can be fixed. The speed can also be varied based on a number of responses being received. The speed that the power ramps up can also slow down as the power increases, as in a case where the ramping speed is slowed in proportion to the increase in effective communication area as the power increases.

The reader can also perform a combination of continuous power ramping and stepping. For example, the reader can gradually and continuously ramp from a first to a second power level, then step to a third power level, then step to a fourth power level and gradually and continuously ramp to a fifth power level.

Listen Before Talk Mode

An extension of the present invention, useable in combination with the ramped interrogator power levels, or as a standalone feature, is what is referred to herein as "listen before talk."

Modern systems have much higher dynamic range than earlier generations. For instance, one RFID tag reader currently in development by the assignee hereof has a dynamic range of about 150 dB. Current readers have a dynamic range of only about 60 dB. Because the reception capability of the new generation of readers will be greatly improved, the chance for crosstalk interference is greater, even with a ramped power level scheme. The problem is exacerbated in high tag density or high reader density situations.

Figure 7:
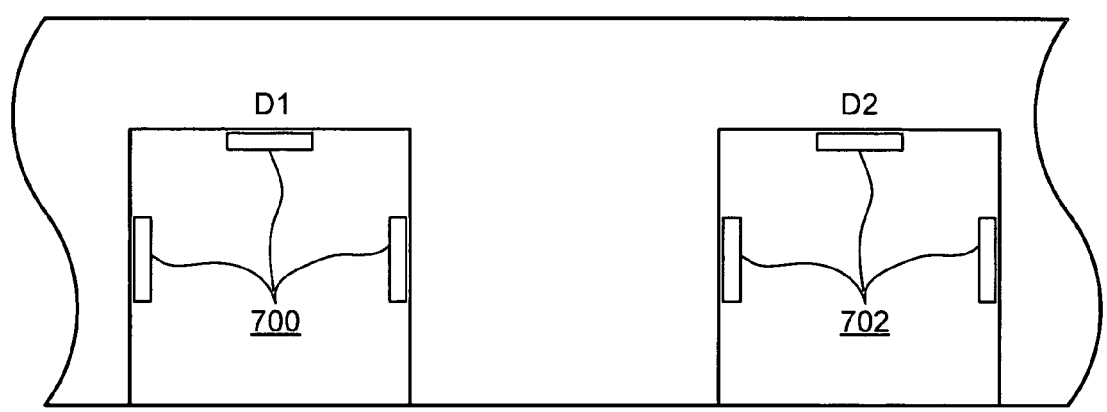
FIG. 7 illustrates a dock door RFID scenario.

Assume the following scenario. A warehouse has 20 dock doors, each one 10 feet wide and spaced 10 feet apart. FIG. 7 illustrates two such doors D1, and D2 and associated RFID tag reader sets. Each reader set may include multiple readers 700, 702 that communicate together, or that communicate independently of one another. Alternatively, each door may have only a single reader.

In this example, RFID tag readers 700, 702 are placed along both sides and along the top edge of the door frame in order to quickly scan pallets of tagged goods passing through the door. The readers 700, 702 are all transmitting simultaneously, and so the signals overlap each other. Even if the readers transmit only periodically, there will be times when the signals overlap. The problem is that backscatter from tags passing through door D1 will be picked up by the readers 702 on door D2. This will interfere with any communications that the readers 702 on door D2 are trying to have, and the readers 702 on door D2 may even think that the tags are passing through door D2. Further, backscatter from the readers 702 on door D2 interfere with the readers 700 on door D1, perhaps making them unable to read the tags passing through door D1.

The proposed solution is to implement a listen before talk mode. In one embodiment, described in terms of the example of FIG. 7, the readers 700, 702 listen for any carrier signal being transmitted. If none is present, readers 700 send out a burst in an attempt to detect any nearby tags. If tags respond, the readers 700 read the tags. Any other readers 702 in the vicinity will detect the carrier signal of readers 700 and wait to transmit so that the signals do not overlap temporally.

The readers can transmit their queries randomly. Because the queries are typically a fraction of a second, all readers in the vicinity should be able to query frequently enough to detect any tags passing thereby. In this way, multiple readers in the dock door scenario would be able to function semi-concurrently without having to be interconnected.

Figure 8:
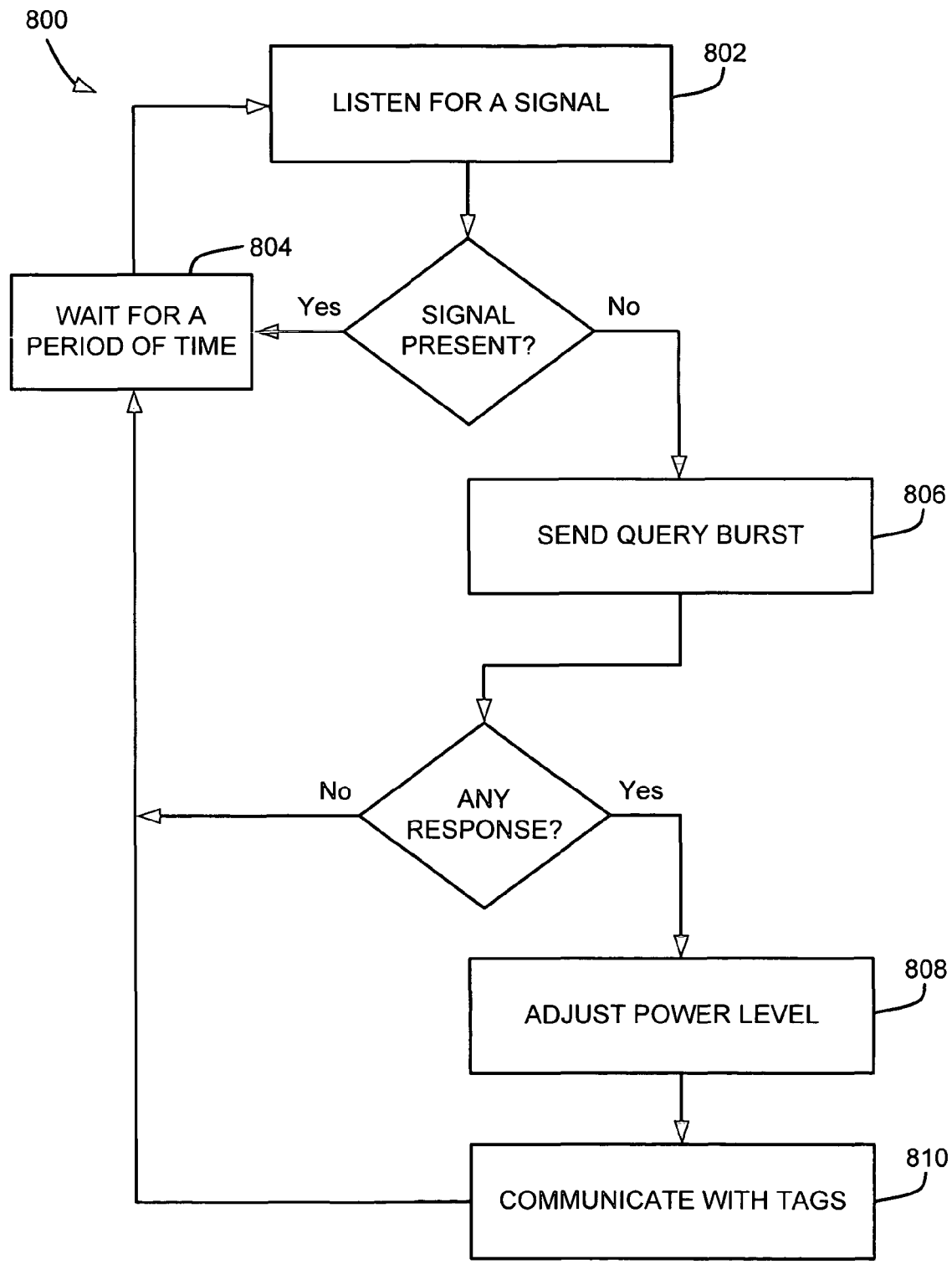
FIG. 8 is a flow diagram of a method performed by a reader in a listen then talk mode.

FIG. 8 illustrates a general method 800 performed by a reader in a listen then talk mode. In operation 802, the reader listens for a signal that could potentially or is known to interfere with the reader's communications. Such signals typically would include signals from other readers and associated tag backscatter, but could also include other types of interfering signals such as walkie-talkie signals, etc. If such a signal is present, the reader waits for a period of time in operation 804 before listening again. The period of time can be preselected, such as 10 microseconds, 50 microseconds, etc. The period of time can also be randomly selected, such as based on a random number, but should be within some predetermined range, for example, less than about 1 second, 5 seconds, etc. If no signal is detected, then, in operation 806, a query burst is transmitted to determine if any tags are present. If there is no response, the reader again waits for a period of time (operation 804) prior to listening again (operation 802). If one or more tags respond, the power level can be adjusted in optional operation 808. In operation 810, the reader communicates with the tag(s). Then the process repeats.

In another embodiment, the readers can all be connected to a backend system such as a network coordinator that coordinates when the readers transmit query bursts and/or communicate with tags. Because the system coordinator knows when a reader is talking, the listen function need not be implemented. However, the system coordinator could merely indicate the period of time the readers should wait between queries. This system can ensure that all readers operate in an ordered or pseudo-random fashion, which may be desirable in a high reader density and/or high tag density situation where tags are rapidly moving past readers.

Again, the listen before talk mode can also include ramping the power levels of the readers. For example, in an extension of the embodiment of the previous paragraph, the sending of queries by a plurality of RFID interrogators can be coordinated such that the queries do not temporally overlap each other. The power level of one of the interrogators communicating with an RF device can be adjusted such that the communications do not interfere with simultaneously performed queries. Alternatively or in combination therewith, the power level of any interrogators sending queries can be adjusted such that the queries do not interfere with the simultaneously performed communication between one of the interrogators and an RF device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for communicating with a plurality of radio frequency identification (RFID) devices by, comprising:
   transmitting a series of signals comprising a first signal and a second signal, using a first RFID reader, the second signal being transmitted at an increased power level relative to the first signal;
   transmitting a third signal having a power level increasing from a first power level to a second power level in a continuous analog manner where a rate of the continuous increasing slows as the power level of the third signal increases;
   interrogating RFID devices responding to at least one signal in the series of signals;
   receiving a selection of each power level from a backend system, at least some of the power levels being selected by the backend system based on response from the first RFID reader and one or more other RFID readers in communication with the backend system so that the selected power levels do not interfere with a query being conducted by a second RFID reader simultaneously with the transmitting of the series of signals, the first and the second RFID readers being connected to the backend system; and
   at each power level:
   singulating RFID devices responding to the signal via backscatter communications;
   instructing the responding RFID devices to change state to an unresponsive state;
   wherein the first signal is transmitted at the first power level,
   wherein the second signal is transmitted at the second power level,
   wherein the transmitting the series of signals, the interrogating the RFID devices, and the instructing the responding RFID devices to change state are performed by the first RFID reader,
   wherein one or more of the RFID devices responding to the first signal do not respond to the second signal upon changing state in response to the instruction to change state to the unresponsive state; and
   wherein a variation in a backscattering power level of the RFID devices located within a maximum effective communication range is less than about 100:1.

2. The method of claim 1, wherein the unresponsive state is a sleep mode.

3. The method of claim 1, wherein a time period of transmission of each signal is about the same.

4. The method of claim 1, wherein a time period of transmission of each signal is different.

5. The method of claim 1, wherein a time period of transmission of each signal is dependent upon a result of a protocol search.

6. The method of claim 1, wherein the backend system selects an amount of time to remain at each of the first and second power levels.

7. The method of claim 1, wherein the RFID devices are RFID tags.

8. The method of claim 1, wherein a time period of transmission of each of the series of signal is about the same,
   wherein a speed at which the continuous increasing slows is varied based on a number of backscatter responses received from the RFID devices, and
   wherein the second power level is a maximum power level allowed by law.

* * * * *